United States Patent
Yarbrough et al.

(10) Patent No.: US 9,951,751 B2
(45) Date of Patent: Apr. 24, 2018

(54) SEGMENTED WIND TURBINE ROTOR BLADE WITH ROD AND TUBE JOINT CONNECTION

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 264 days.

(21) Appl. No.: 14/870,982

(22) Filed: Sep. 30, 2015

(65) Prior Publication Data

US 2017/0089323 A1 Mar. 30, 2017

(51) Int. Cl.
*F03D 1/06* (2006.01)
*F03D 13/10* (2016.01)

(52) U.S. Cl.
CPC .......... *F03D 1/0675* (2013.01); *F03D 13/10* (2016.05); *F05B 2220/30* (2013.01); *F05B 2220/706* (2013.01); *F05B 2230/60* (2013.01); *F05B 2240/21* (2013.01); *F05B 2240/302* (2013.01); *Y02E 10/721* (2013.01); *Y02P 70/523* (2015.11)

(58) Field of Classification Search
CPC ...... F03D 1/0675; F03D 13/10; F03D 1/0685; Y02E 10/721; F05B 2220/706
USPC ...................................................... 415/223
See application file for complete search history.

(56) References Cited

U.S. PATENT DOCUMENTS

| 7,654,799 | B2 | 2/2010 | Eyb | |
|---|---|---|---|---|
| 8,079,820 | B2 * | 12/2011 | Stam | F03D 1/0675 416/223 R |
| 8,511,996 | B2 * | 8/2013 | Llorente Gonzalez | F03D 1/0675 416/132 B |
| 8,662,853 | B2 * | 3/2014 | Vasudeva | F03D 1/0675 29/889.71 |
| 8,764,401 | B2 | 7/2014 | Hayden et al. | |
| 2009/0136355 | A1 | 5/2009 | Finnigan et al. | |
| 2009/0196755 | A1 * | 8/2009 | Peace | F03D 1/0675 416/226 |
| 2010/0310379 | A1 | 12/2010 | Livingston | |
| 2011/0158788 | A1 | 6/2011 | Bech et al. | |
| 2012/0213642 | A1 | 8/2012 | Wang et al. | |
| 2012/0269643 | A1 | 10/2012 | Hibbard et al. | |

(Continued)

FOREIGN PATENT DOCUMENTS

| CN | 103670910 A | 3/2014 |
|---|---|---|
| CN | 203594564 U | 5/2014 |
| DE | 102012019351 A1 | 4/2014 |

(Continued)

*Primary Examiner* — Aaron R Eastman
(74) *Attorney, Agent, or Firm* — Dority & Manning, P.A.

(57) ABSTRACT

A blade segment for a wind turbine rotor blade may generally include a body shell terminating at a joint end. The body shell may include a pressure side and a suction side extending between a leading edge and a trailing edge. The blade segment may also include a plurality of pressure side tubes extending adjacent to the pressure side of the body shell and a plurality of suction side tubes extending adjacent to the suction side of the body shell, with the plurality of pressure side tubes being spaced apart from the plurality of suction side tubes along a flapwise direction of the rotor blade.

20 Claims, 15 Drawing Sheets

(56) References Cited

U.S. PATENT DOCUMENTS

2015/0152839 A1* 6/2015 Busbey ............... F03D 1/0675
416/132 B

FOREIGN PATENT DOCUMENTS

| WO | WO 2013/178639 A1 | 12/2013 |
| WO | WO 2015/003713 A1 | 1/2015 |
| WO | WO 2015/051803 A1 | 4/2015 |

* cited by examiner

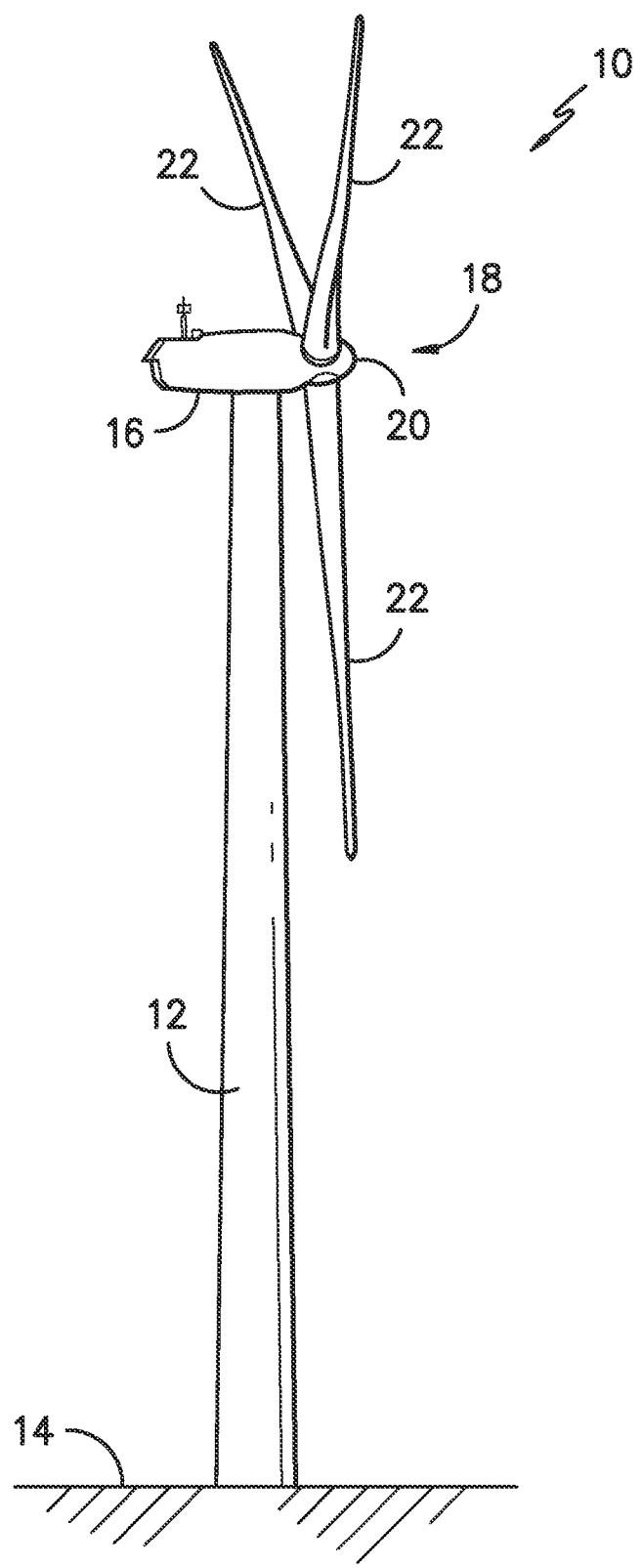
FIG. -1-

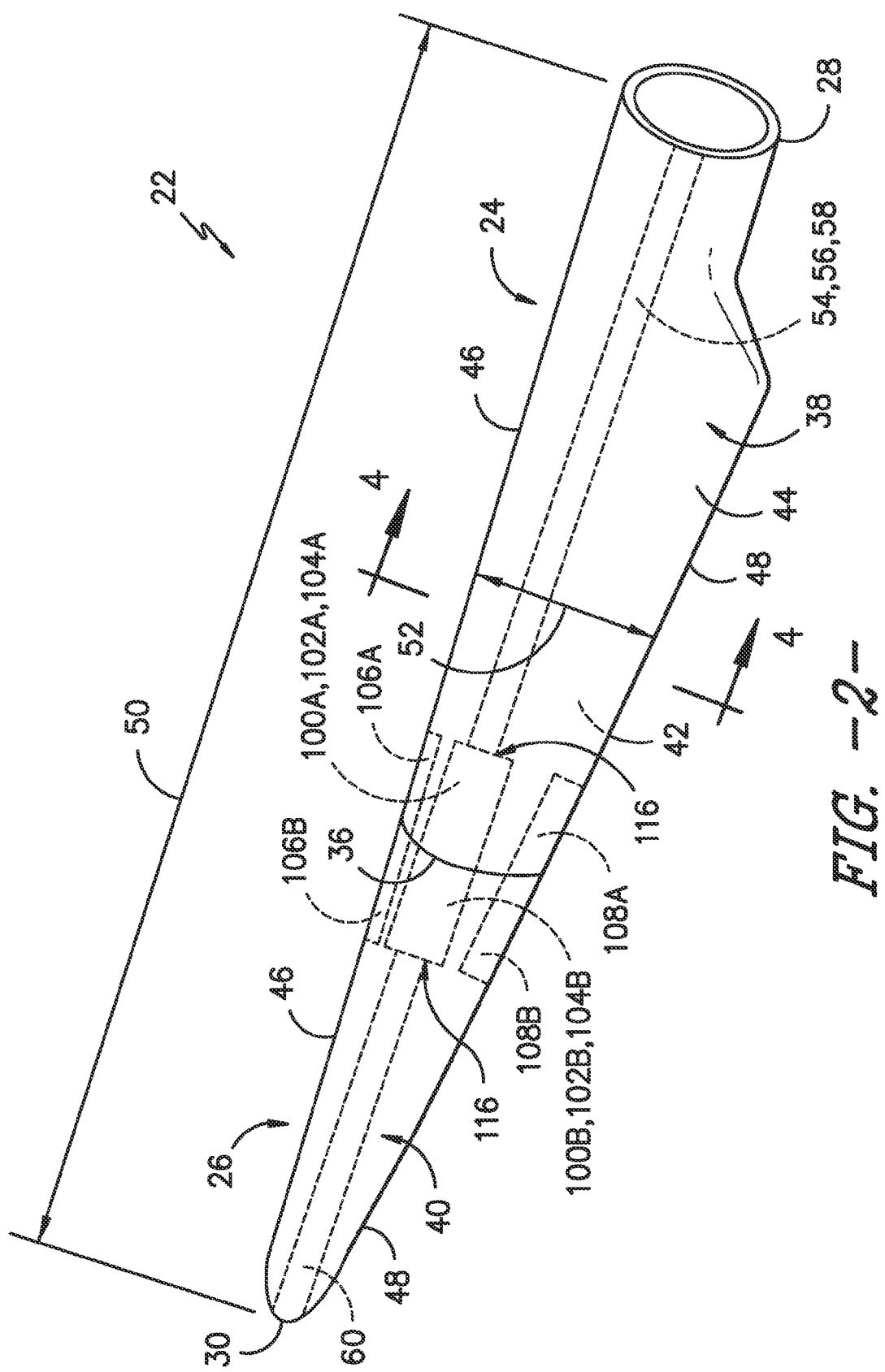
FIG. -2-

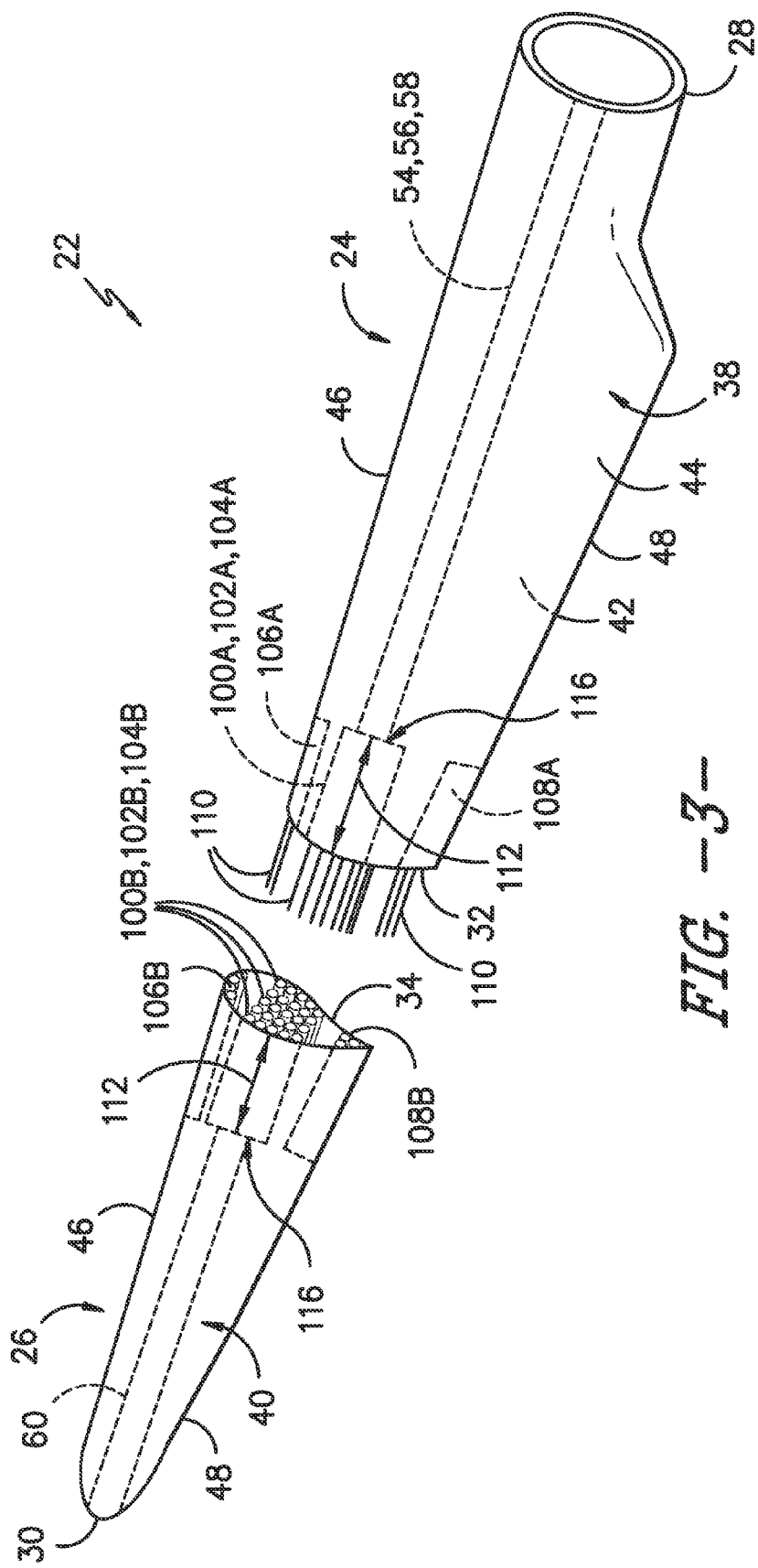
FIG. -3-

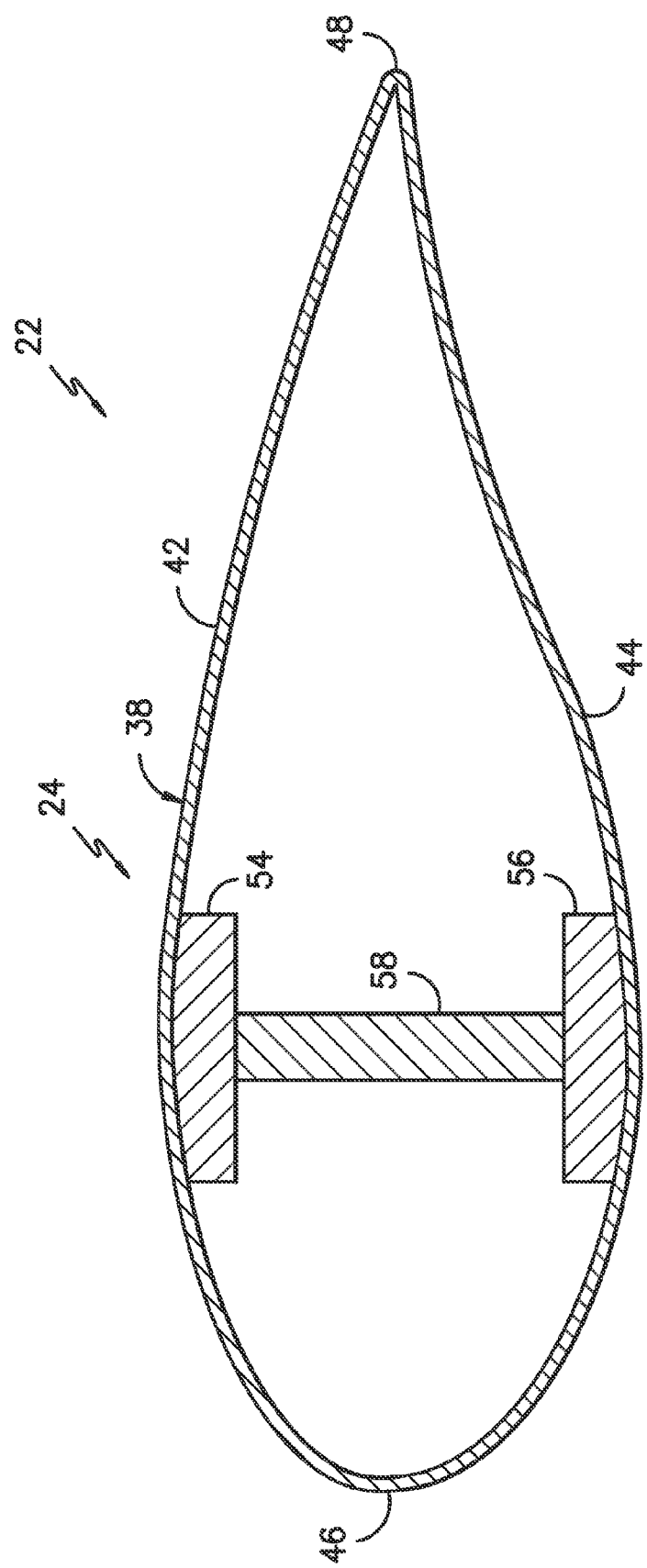
FIG. -4-

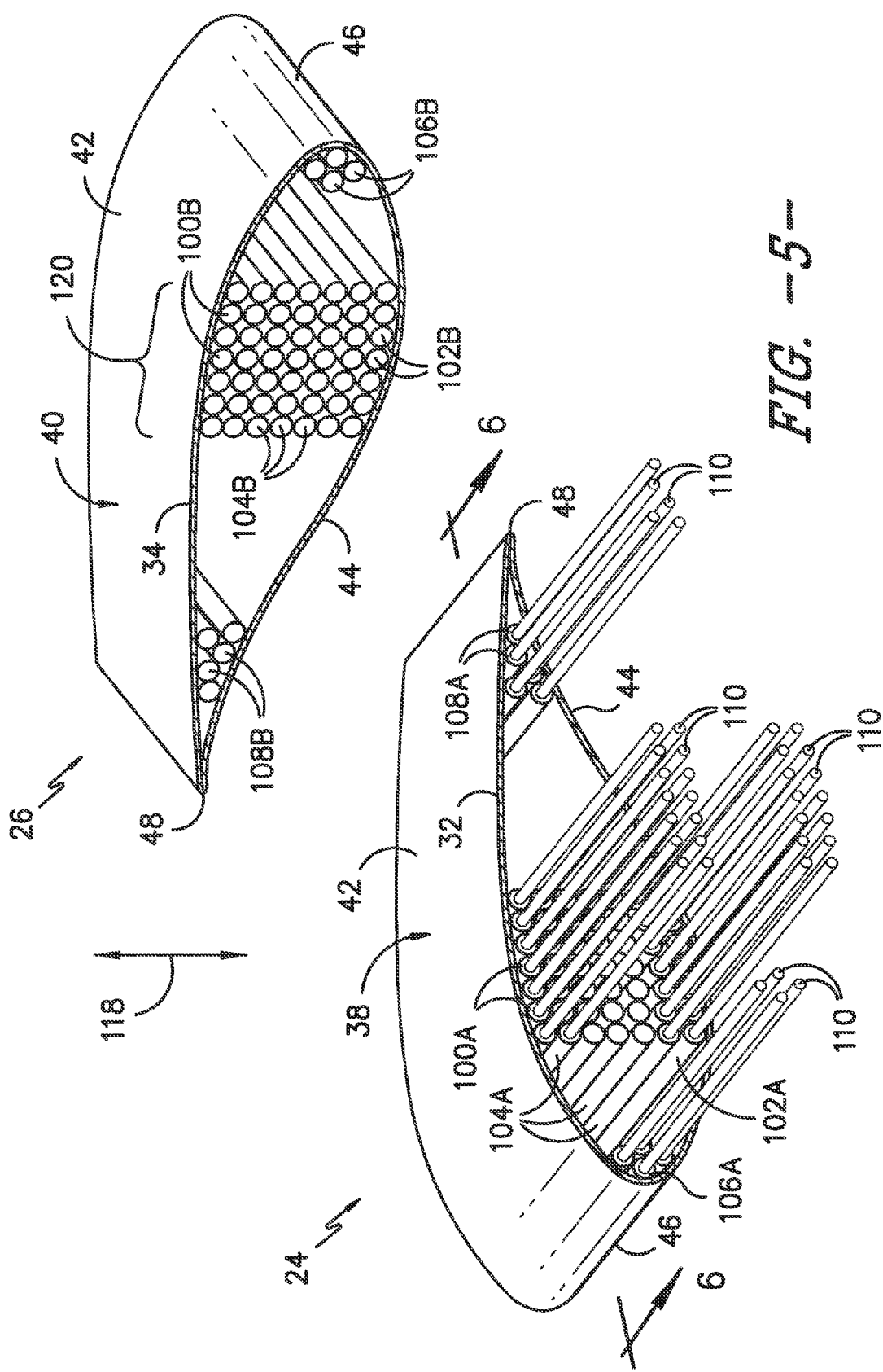
FIG. -5-

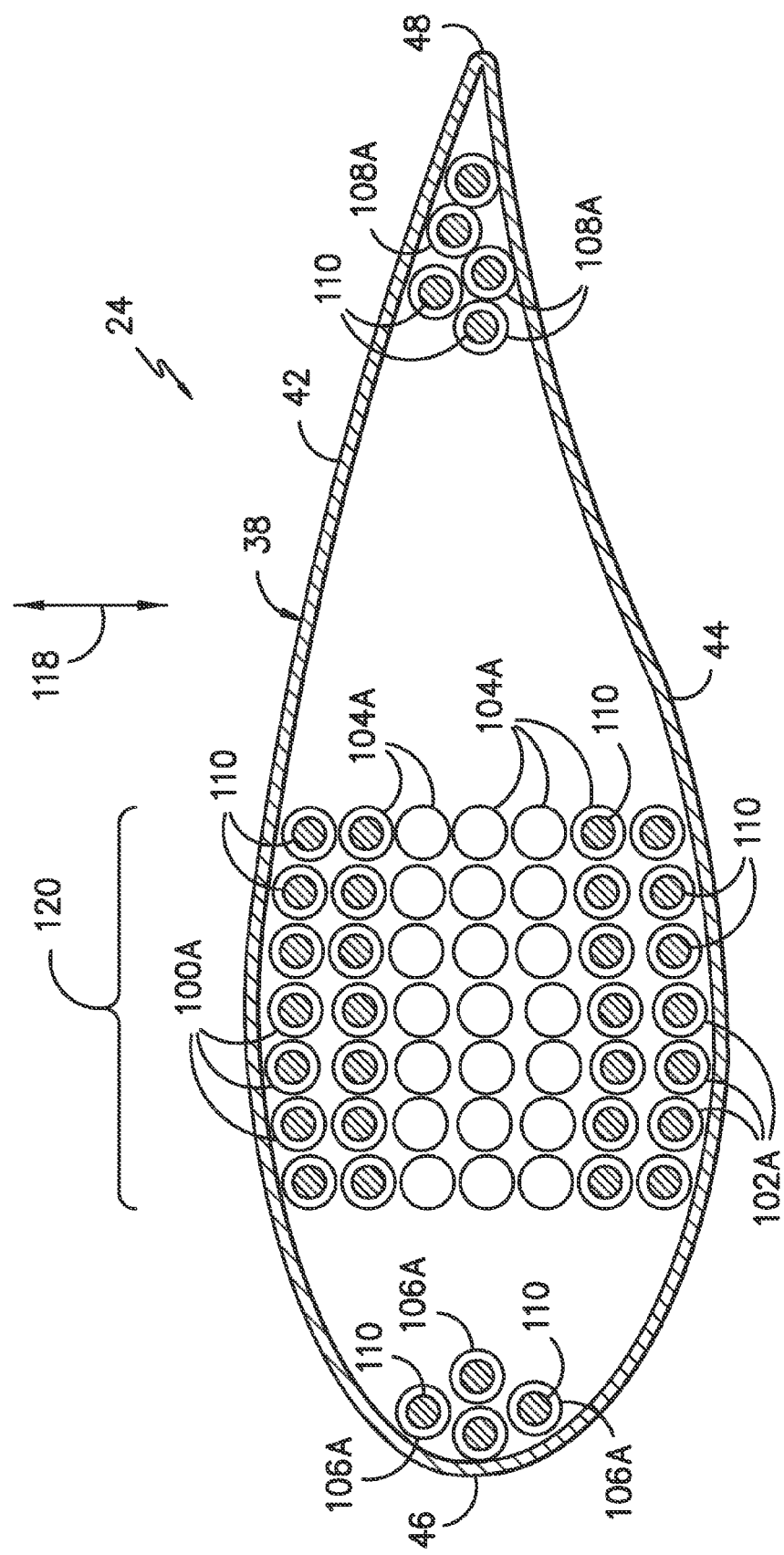
FIG. -6-

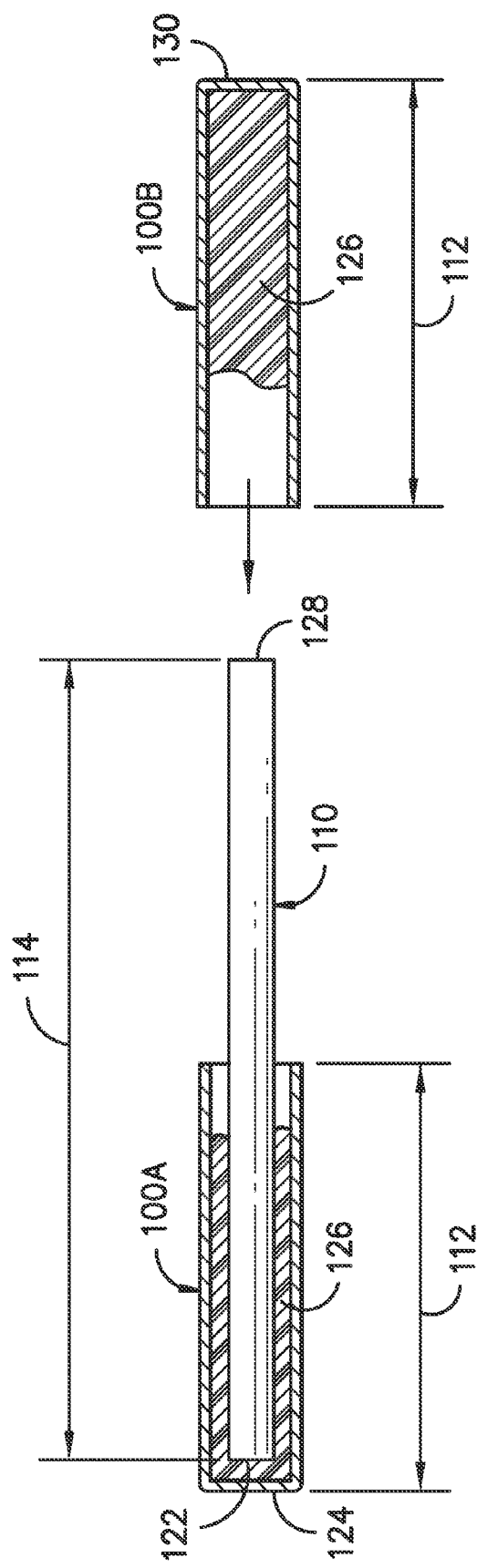
FIG. -7-

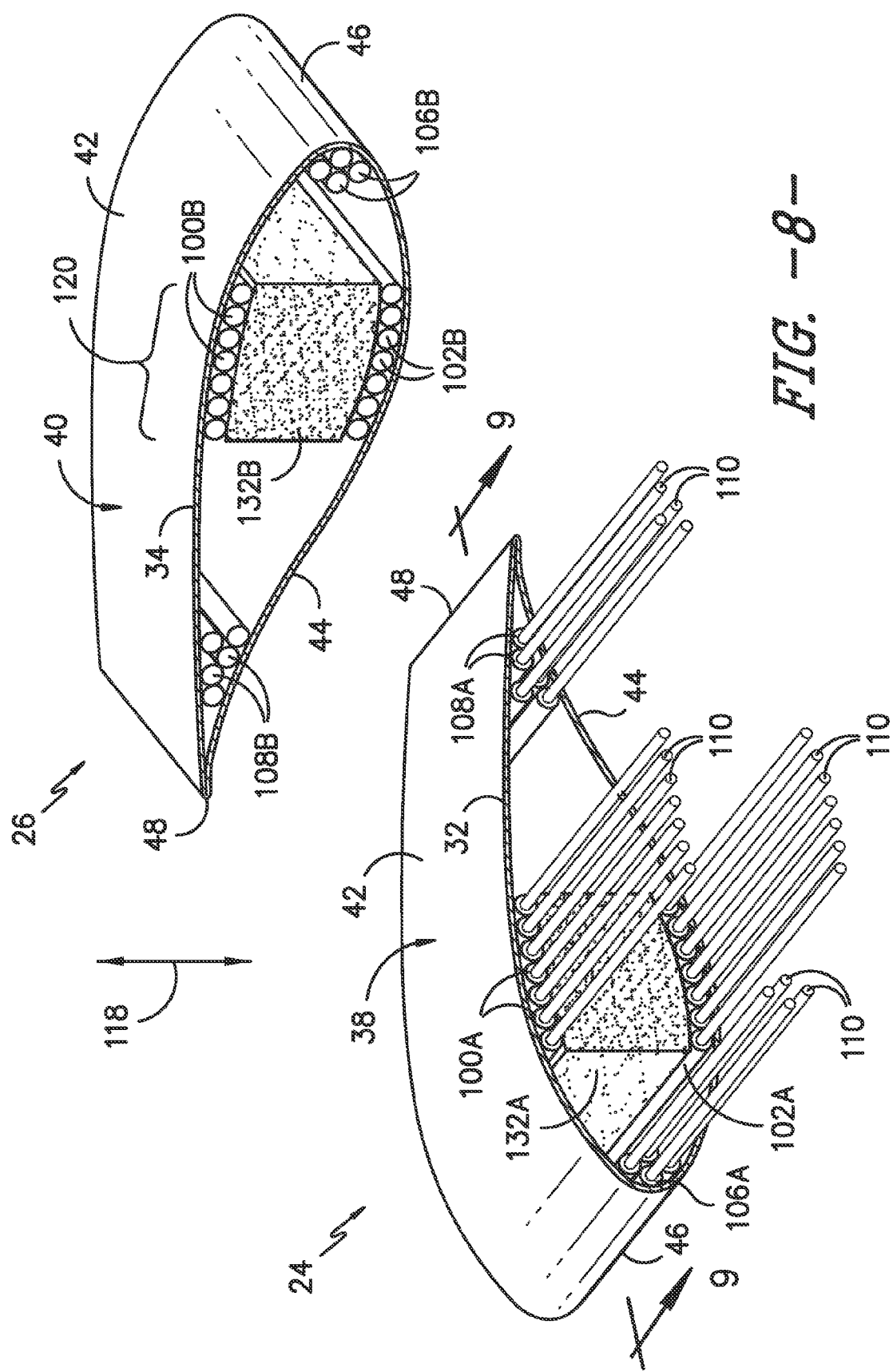
FIG. -8-

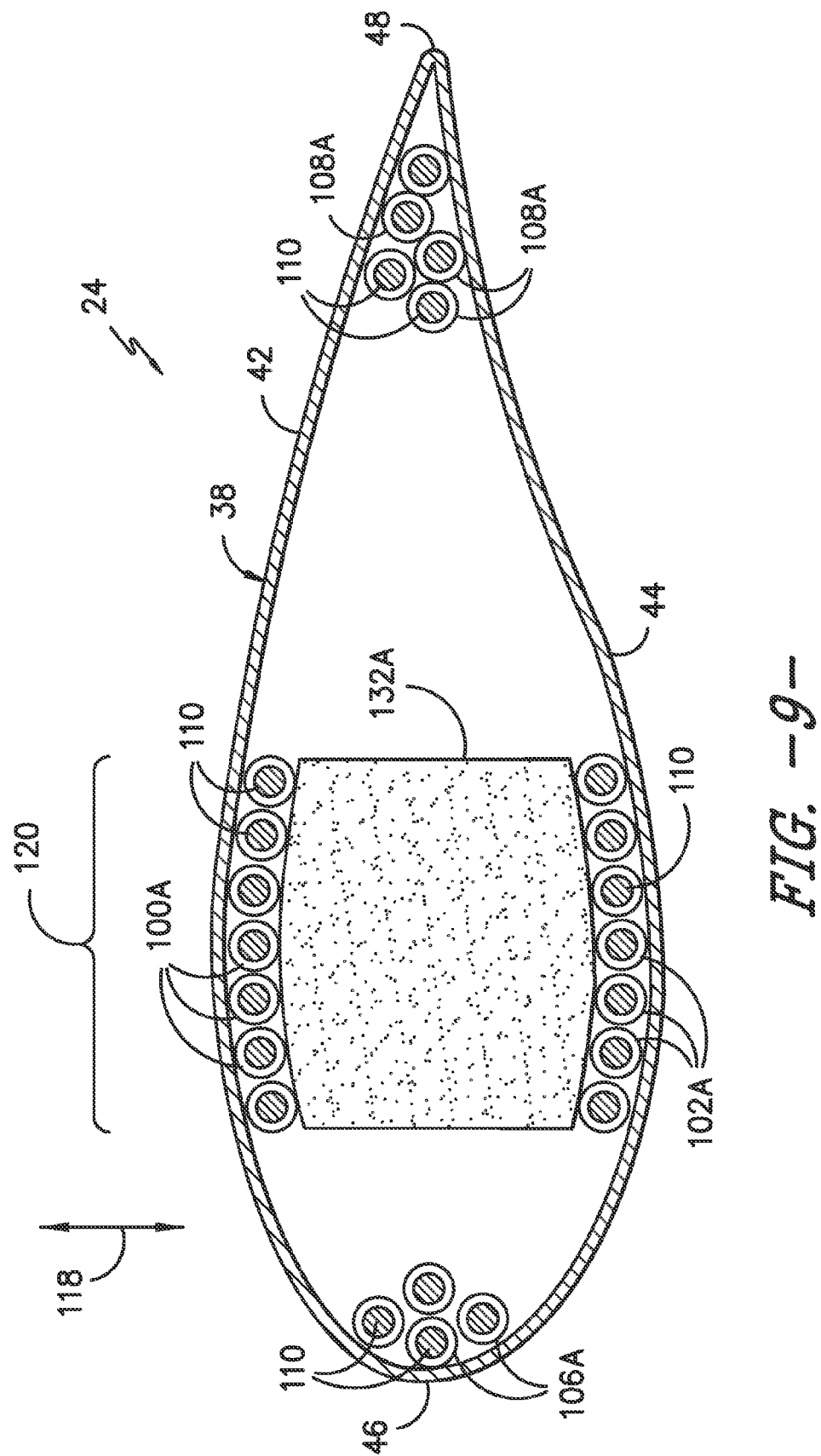
FIG. -9-

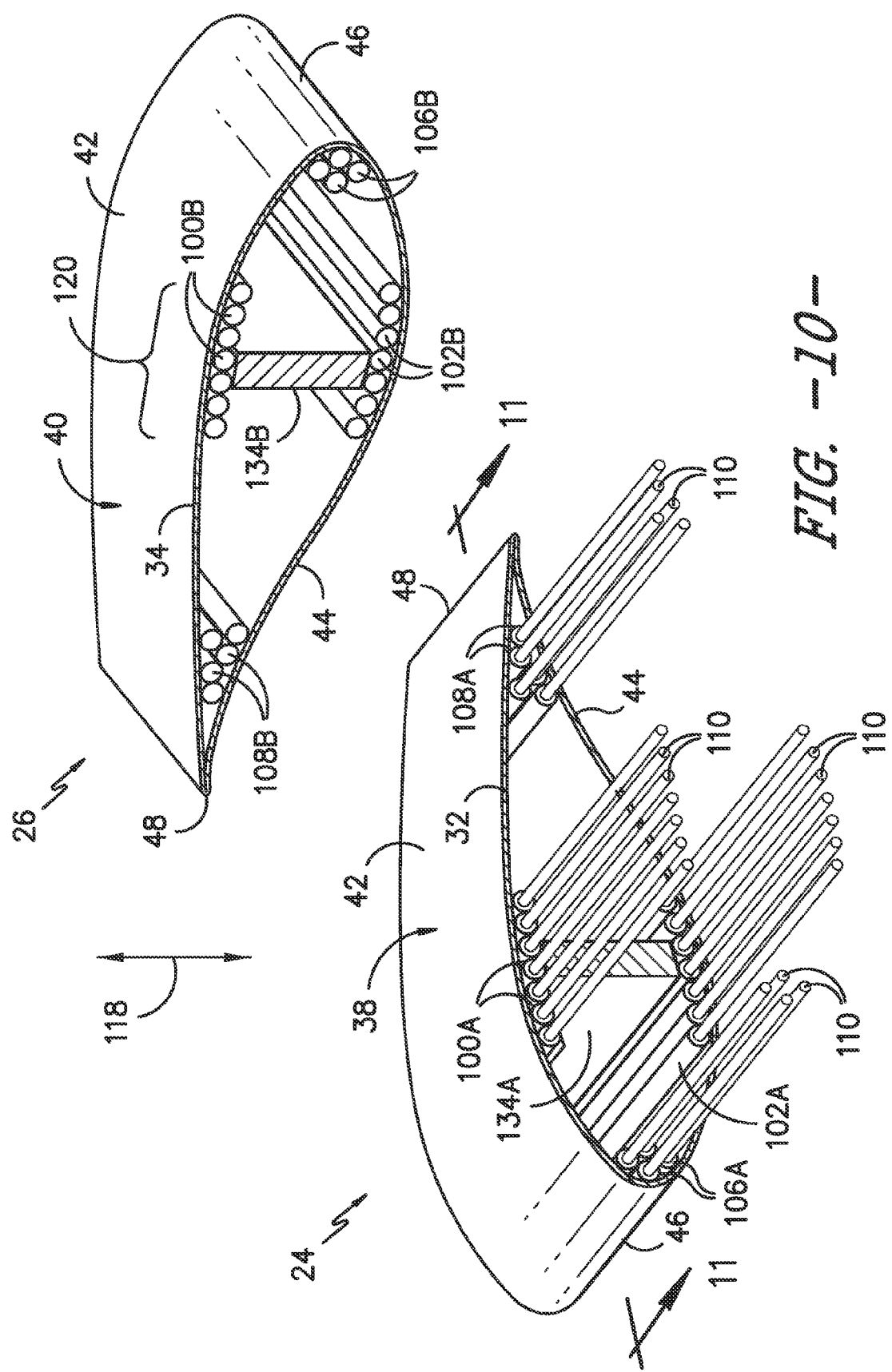
FIG. -10-

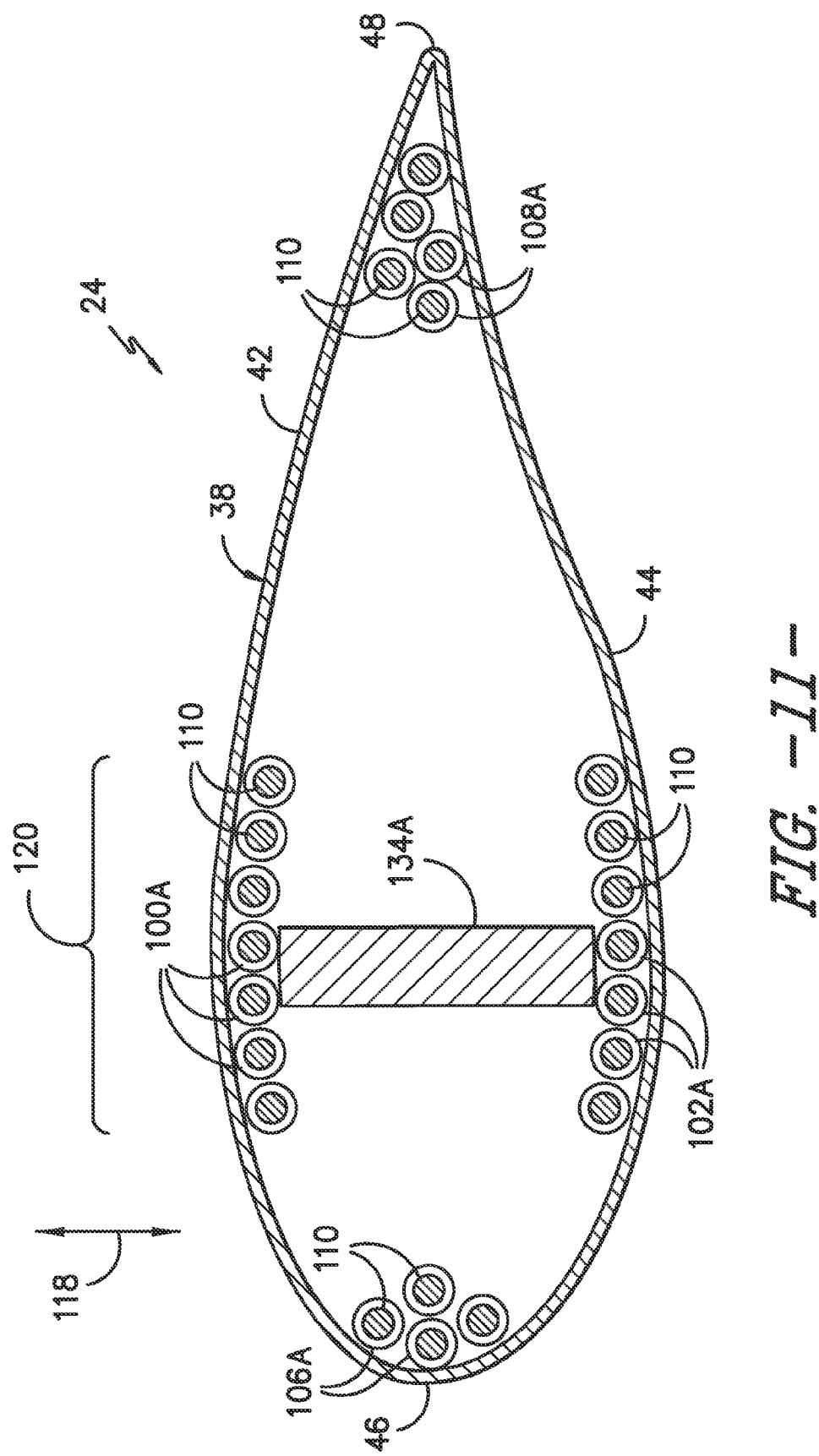
FIG. -11-

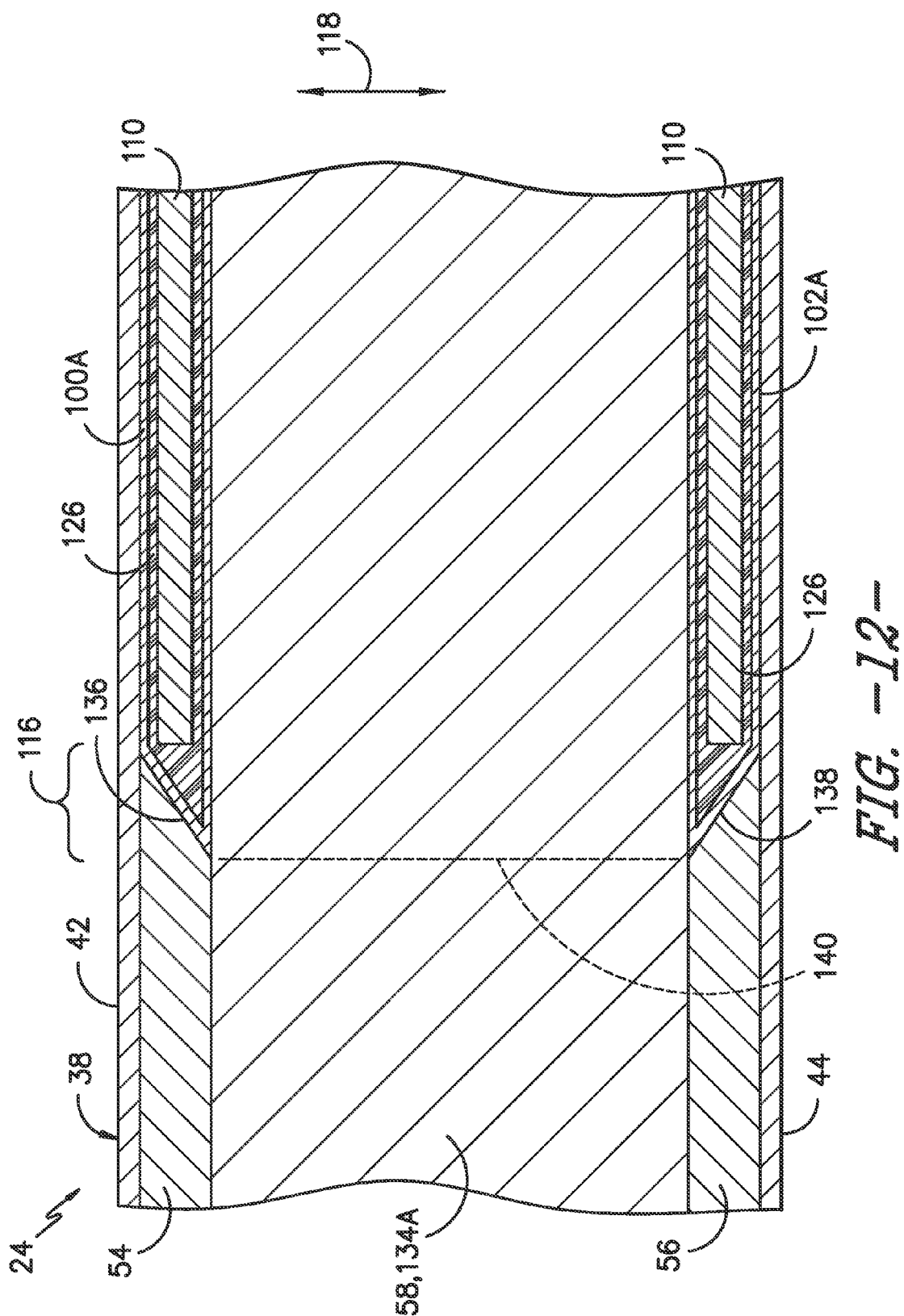
FIG. -12-

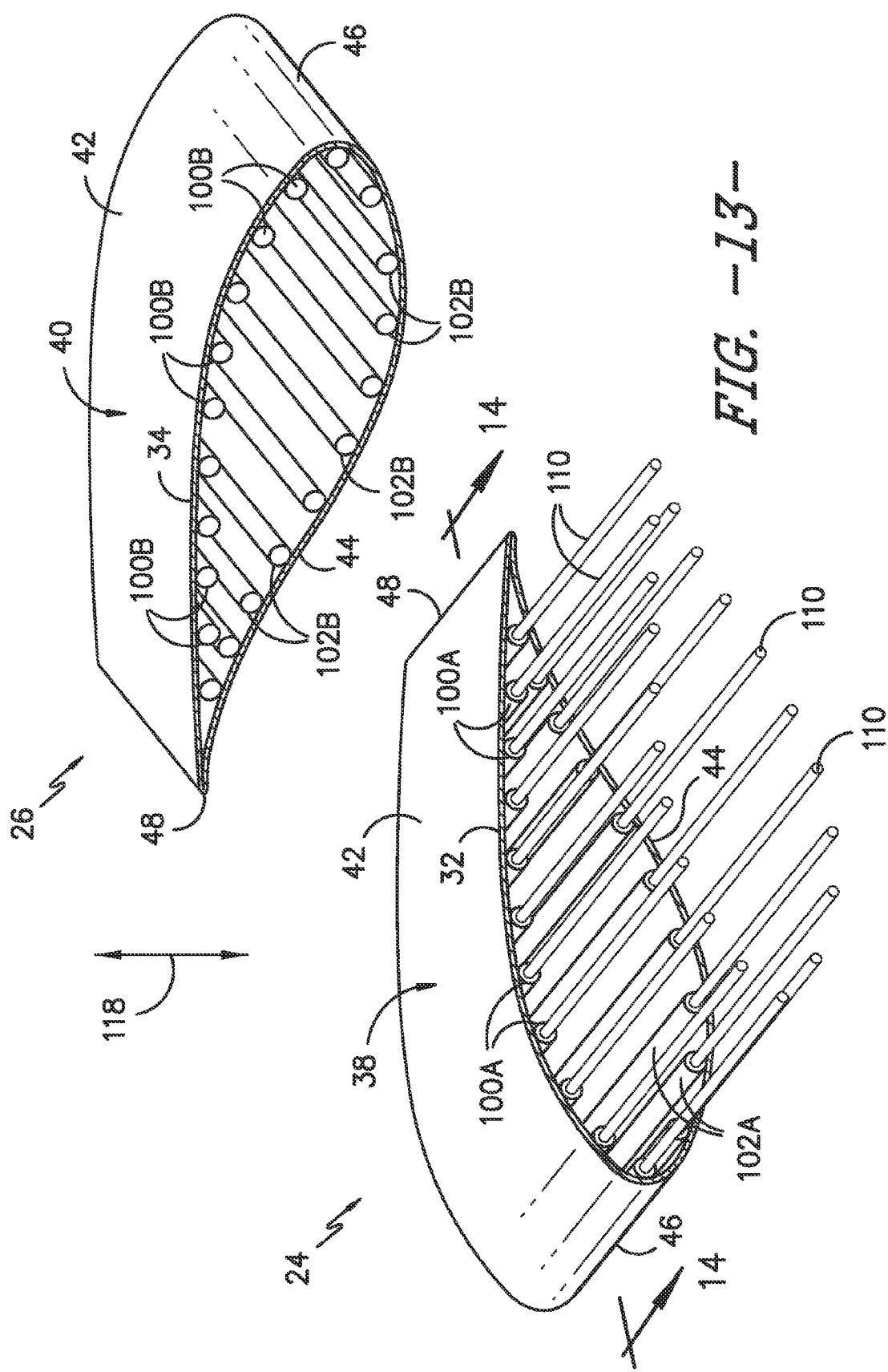
FIG. -13-

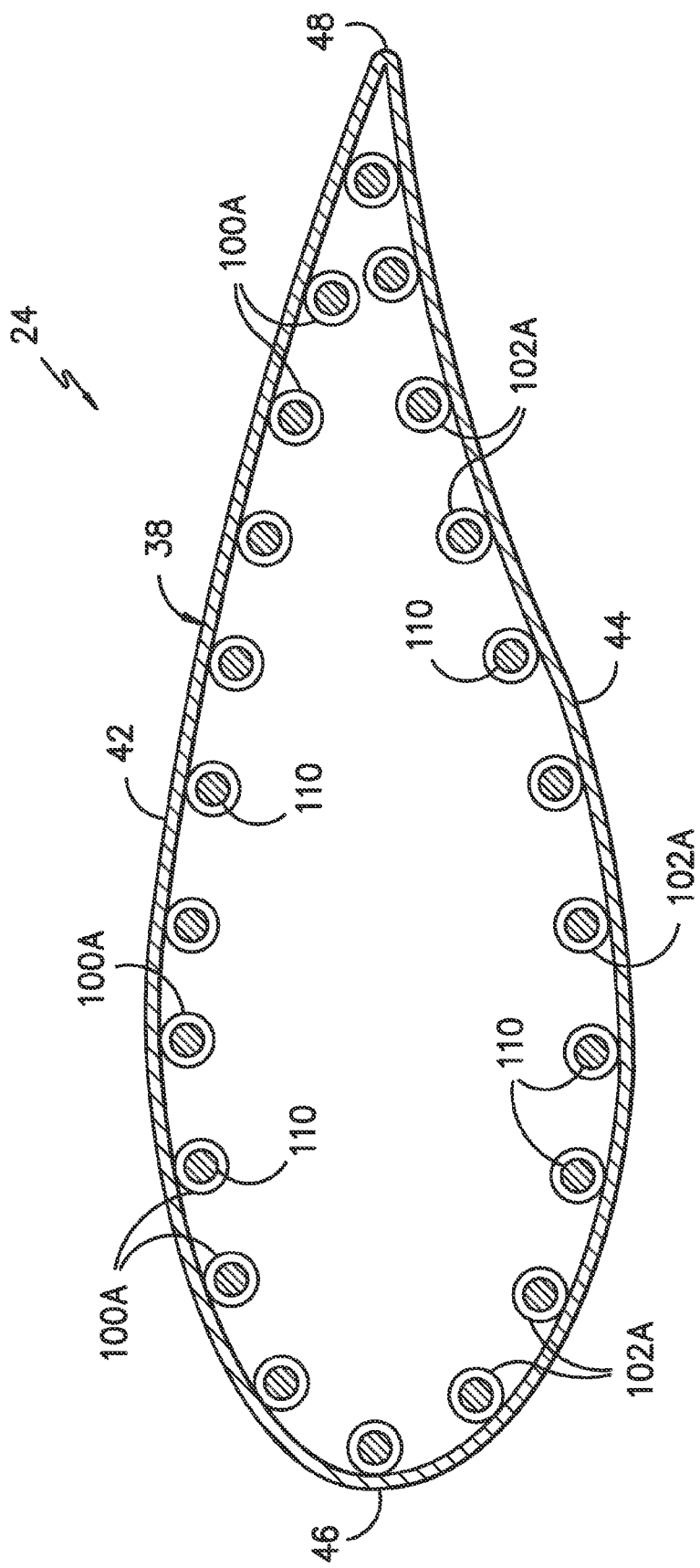
FIG. -14-

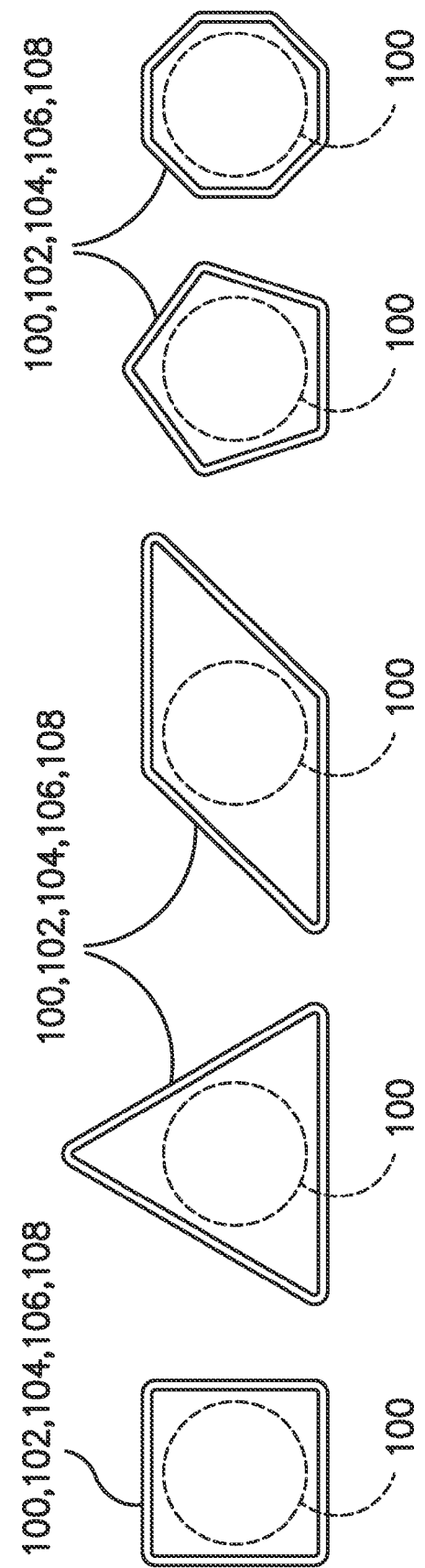
FIG. -15-

SEGMENTED WIND TURBINE ROTOR BLADE WITH ROD AND TUBE JOINT CONNECTION

FIELD OF THE INVENTION

The present subject matter relates generally to segmented wind turbine rotor blades and, more particularly, to a segmented rotor blade including a rod and tube joint connection between adjacent blade segments.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade of a wind turbine typically includes a suction side shell and a pressure side shell formed using molding processes that are subsequently bonded together via adhesives at bond lines along the leading and trailing edges of the blade. The pressure and suction side shells are relatively lightweight and have structural properties (e.g., stiffness, buckling resistance and strength) that are not configured to withstand the bending moments and other loads exerted on the rotor blade during operation. Thus, to increase the stiffness, buckling resistance and strength of the rotor blade, the shells are typically reinforced using one or more structural components (e.g. opposed spar caps with a shear web configured therebetween) that engage the pressure and suction side inner surfaces of the shell halves. The spar caps are typically constructed of various materials, including but not limited to, fiber-reinforced laminate composites including a thermoset resin. The shells of the rotor blade are generally built around the spar caps by stacking layers of fiber fabrics in a shell mold. The layers are then typically infused together, e.g. with a thermoset resin.

In general, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting blade segments together typically have a variety of disadvantages. For example, many known joint designs utilize mechanical fasteners, such as bolts and nuts, to secure blade segments together. However, the fastening components used in such bolted joint designs are typically quite heavy, thereby significantly increasing the overall weight of the rotor blade. Additionally, it is known to create a scarfed joint between two blade segments in which the joint ends of the segments are machined to form a scarfed or tapered profile across which a hand laminate is subsequently applied to join the segments together. However, such scarfing methodologies are often very time consuming and quite complex.

Accordingly, an improved joint connection for joining adjacent blade segments of a segmented blade that addresses one or more of the issues described above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a first blade segment including a first body shell terminating at a first joint end. The first body shell may include a pressure side and a suction side extending between a leading edge and a trailing edge. The first blade segment may also include a first pressure side tube extending adjacent to the pressure side of the first body shell and a first suction side tube extending adjacent to the suction side of the first body shell, with the first pressure side tube being spaced apart from the first suction side tube along a flapwise direction of the rotor blade. The rotor blade may also include a second blade segment including a second body shell terminating at a second joint end. The second body shell may include a pressure side and a suction side extending between a leading edge and a trailing edge. The second blade segment may also include a second pressure side tube extending adjacent to the pressure side of the second body shell and a second suction side tube extending adjacent to the suction side of the second body shell, with the second pressure and suction side tubes being configured to be aligned with the first pressure and suction side tubes, respectively, when the second joint end of the second blade segment is coupled to the first joint end of the first blade segment. In addition, the rotor blade may also include a plurality of support rods extending between the first and second blade segments. The plurality of support rods may include a first support rod extending from the first pressure side tube to the second pressure side tube and a second support rod extending from the first suction side tube to the second suction side tube.

In another aspect, the present subject matter is directed to a blade segment for a wind turbine rotor blade. The blade segment may generally include a body shell terminating at a joint end. The body shell may include a pressure side and a suction side extending between a leading edge and a trailing edge. The blade segment may also include a plurality of pressure side tubes extending adjacent to the pressure side of the body shell and a plurality of suction side tubes extending adjacent to the suction side of the body shell, with the plurality of pressure side tubes being spaced apart from the plurality of suction side tubes along a flapwise direction of the rotor blade.

In a further aspect, the present subject matter is directed to a method for assembling a rotor blade. The method may generally include positioning a first joint end of a first blade segment relative to a second joint end of a second blade segment. The first blade segment may include a first pressure side tube extending adjacent to a pressure side of the first blade segment and a first suction side tube extending adjacent to a suction side of the first blade segment. The first pressure side tube may be spaced apart from the first suction side tube along a flapwise direction of the rotor blade. The second blade segment may include a second pressure side tube extending adjacent to a pressure side of the second blade segment and a second suction side tube extending adjacent to a suction side of the second blade segment. The method may also include inserting a first support rod within one of the first pressure side tube or the second pressure side tube and a second support rod within one of the first suction side tube or the second suction side tube. In addition, the method may include moving the first and second blade segments together such that the first support rod is received within the other of the first pressure side tube or the second pressure side tube and the second support rod is received within the other of the first suction side tube or the second suction side tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a segmented rotor blade suitable for use within the wind turbine of FIG. 1 in accordance with aspects of the present subject matter;

FIG. 3 illustrates an exploded view of the segmented rotor blade shown in FIG. 2;

FIG. 4 illustrates a cross-sectional view of the rotor blade shown in FIG. 2 taken about line 4-4;

FIG. 5 illustrates a perspective view of portions of the blade segments shown in FIG. 3, particularly illustrating a plurality of tubes and support rods installed at the joint ends of the blade segments;

FIG. 6 illustrates a cross-sectional view of one of the blade segments shown in FIG. 5 taken about line 5-5;

FIG. 7 illustrates a cross-sectional view illustrating one embodiment of a method for installing a support rod within an aligned pair of tubes extending within the blade segments;

FIG. 8 illustrates a similar perspective view as that shown in FIG. 5, particularly illustrating another embodiment of a rod/tube arrangement that may be utilized within the blade segments in accordance with aspects of the present subject matter;

FIG. 9 illustrates a cross-sectional view of one of the blade segments shown in FIG. 8 taken about line 9-9;

FIG. 10 illustrates another similar perspective view as that shown in FIG. 5, particularly illustrating a further embodiment of a rod/tube arrangement that may be utilized within the blade segments in accordance with aspects of the present subject matter;

FIG. 11 illustrates a cross-sectional view of one of the blade segments shown in FIG. 10 taken about line 11-11;

FIG. 12 illustrates a partial, cross-sectional view of one embodiment of a segmented rotor blade configured in accordance with aspects of the present subject matter, particularly illustrating a transition area across which the support structure of the blade transitions from a spar cap/shear web arrangement to a rod/tube arrangement;

FIG. 13 illustrates another similar perspective view as that shown in FIG. 5, particularly illustrating another embodiment of a rod/tube arrangement that may be utilized within the blade segments in accordance with aspects of the present subject matter;

FIG. 14 illustrates a cross-sectional view of one of the blade segments shown in FIG. 13 taken about line 14-14; and FIG. 15 illustrates various examples of suitable cross-sectional shapes that may be defined by the disclosed tubes in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a segmented rotor blade including a rod/tube jointed connection(s) between its blade segments. Specifically, in several embodiments, the rotor blade may include a first blade segment and a second blade segment, with each blade segment including a plurality of hollow tubes extending within its interior. As will be described below, each tube of the first blade segment may be configured to be aligned with a corresponding tube of the second blade segment when the first and second blade segments are being coupled together. Additionally, the rotor blade may include a plurality of support rods configured to extend between the first and second blade segments, with each rod being received within an aligned pair of the hollow tubes extending within the blade segments. For example, ends of the rods may be installed within all or a portion of the hollow tubes of the first blade segment. Thereafter, when the first and second blade segments are being coupled together, the opposed ends of the support rods may be inserted within the corresponding hollow tubes of the second blade segment as the blade segments are moved closer together. As such, the support rods may serve as structural members extending across the joint interface defined between the blade segments, thereby providing a means transferring loads (e.g., axial and bending loads) between the two blade segments. In addition, the support rods may also assist in aligning the blade segments relative to one another during the joining process.

As will be described below, in several embodiments, each blade segment may include a plurality of pressure side tubes extending within the interior of the blade segment adjacent to its pressure side and a plurality of suction side tubes extending within the interior of the blade segment adjacent to its suction side. For instance, in one embodiment, the pressure and suction side tubes may be clustered together along the portions of the inner surfaces of the blade shell at which spar caps would traditionally be located. In such an embodiment, the pressure side tubes may be coupled to the suction side tubes via a separate coupling member(s), such as by stacking a plurality of intermediate tubes between the pressure and suction side tubes, by installing a filler material between the pressure and suction side tubes and/or by installing a shear web between the pressure and suction side tubes. In another embodiment, the pressure and suction side tubes may be spread out across the inner surfaces of the blade shell that extend along the pressure and suction sides of each blade segment. Moreover, in one embodiment, each blade segments may include one or more leading edge tubes extending adjacent to the leading edge of the blade segment and/or one or more trailing edge tubes extending adjacent to the trailing edge of the blade segment.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2-4, one embodiment of a segmented rotor blade 22 suitable for use within the wind turbine 10 shown in FIG. 1 is illustrated in accordance with aspects of the present subject matter. Specifically, FIG. 2 illustrates a perspective, assembled view of the rotor blade 22 and FIG. 3 illustrates a perspective, exploded view of the rotor blade. Additionally, FIG. 4 illustrates a cross-sectional view of the rotor blade 22 shown in FIG. 2 taken about line 4-4.

As shown, the rotor blade 22 may generally be formed from a plurality of spanwise blade segments 24, 26 configured to be coupled end-to-end such that the rotor blade 22 extends between a blade root 28 configured to be mounted or otherwise secured to the hub 20 (FIG. 1) of the wind turbine 10 and a blade tip 30 disposed opposite the blade root 28. For example, in the illustrated embodiment, the rotor blade 22 is formed from two blade segments 24, 26, namely a first blade segment 24 (e.g., a root segment) and a second blade segment 26 (e.g., a tip segment). As particularly shown in FIG. 3, the first blade segment 24 may generally extend lengthwise between the blade root 28 and a first joint end 32. Similarly, the second blade segment 26 may generally extend lengthwise between the blade tip 30 and a second joint end 34. In such an embodiment, the first and blade segments 24, 26 may generally be configured to be coupled to one another at their joint ends 32, 34. For example, as shown in FIG. 2, when the blade segments 32, 34 are coupled end-to-end at their joint ends 32, 34, a blade joint 36 may be defined at the interface between the two segments 24, 26.

It should be appreciated that, in other embodiments, the rotor blade 22 may be formed from any other suitable number of spanwise blade segments. For instance, the rotor blade 22 may be formed from three blade segments or more than three blade segments, such as four blade segments, five blade segments, or more than five blade segments.

In general, each blade segment 24, 26 may include a body shell 38, 40 configured to extend between its opposed ends that generally serves as the outer casing/covering of the blade segment 24, 26. For instance, the first blade segment 24 may include a first body shell 38 extending lengthwise between the blade root 28 and the first joint end 32. Similarly, the second blade segment 26 may include a second body shell 40 extending lengthwise between the second joint end 34 and the blade tip 30. Each of the body shells 38, 40 may generally be configured to define spanwise portions of the aerodynamic profile of the rotor blade 22. As such, the body shells 38, 40 may collectively define a pressure side 42 and a suction side 44 of the rotor blade 22, with the pressure and suction sides 42, 44 extending between leading and trailing edges 46, 48 of the rotor blade 22.

As shown in FIG. 2, when assembled, the rotor blade 22 may also have a span 50 defining the total length between the blade root 28 and the blade tip 30. In addition, the rotor blade 22 may define a chord 52 corresponding to the total length of the blade 22 between its leading and trailing edges 46, 48. As is generally understood, the chord 52 may generally vary in length with respect to the span 50 as the rotor blade 22 extends from the blade root 28 to the blade tip 30.

It should be appreciated that the body shells 38, 40 of the blade segments 24, 26 may be formed from one or more shell components. For instance, in one embodiment, each body shell 38, 40 may be formed form a pressure side shell (not shown) forming a portion of the pressure side 42 of the rotor blade 22 and a suction side shell (not shown) forming a portion of the suction side 44 of the rotor blade 22. In addition, the body shells 28, 30 may generally be formed from any suitable material. For instance, in several embodiments, each body shell 38, 40 may be formed from a fiber-reinforced composite, such as a fiber reinforced laminate including a plurality of fibers (e.g., glass or carbon fibers) surrounded by a suitable matrix material (e.g., a thermoset resin material or a thermoplastic resin material). In addition, one or more portions of each body shell 38, 40 may be configured as a layered construction and may include a core material, formed from a lightweight material such as wood (e.g., balsa), foam (e.g., extruded polystyrene foam) or a combination of such materials, disposed between layers of laminate composite material.

Additionally, each body shell 38, 40 may also include one or more longitudinally extending structural components configured to provide increased stiffness, buckling resistance and/or strength to the rotor blade 22. For example, as shown in the cross-sectional view of FIG. 4, the first blade segment 24 may include a pair of longitudinally extending spar caps 54, 56 configured to be engaged against the opposed inner surfaces of the first body shell 38. Additionally, as shown in FIG. 4, one or more shear webs 584 may be disposed between the spar caps 54, 56 so as to form a beam-like configuration. Moreover, as shown in dashed lines in FIG. 2, the second blade segment may similarly include one or more longitudinally extending structural components 50 extending within the second body shell 40, such as by including opposed spar caps having a shear web extending therebetween.

Moreover, each blade segment 24, 26 may also include a plurality of joint-related components configured to assist in aligning the blade segments 24, 26 relative to one another and/or in securing the blade segments 24, 26 together. The joint-related components may also facilitate the transfer of loads between the blade segments 24, 26. For instance, as will be described in greater detail below, the first blade segment 24 may include a plurality of hollow tubes 100A, 102A, 104A, 106A, 108A extending lengthwise from the first joint end 32 towards the blade root 28 within the interior of the first body shell 38. Similarly, the second blade segment 26 may include a plurality of hollow tubes 100B, 102B, 104B, 106B, 108B extending lengthwise from the second joint end 34 towards the blade tip 30 within the interior of the second body shell 40. In such an embodiment, each tube of the first blade segment 24 may be configured to be aligned within a corresponding tube of the second blade segment 26 when the blade segments 24, 26 are coupled together at their joint ends 32, 34. Additionally, as shown in FIG. 3, the rotor blade 22 may also include plurality of support rods 110 configured to extend between the aligned pairs of tubes such that each rod 110 may serve as a structural component at the blade joint 36 formed between the blade segments 24, 26.

In several embodiments, the hollow tubes of each blade segment 24, 26 may only be configured to extend within the interior of their corresponding body shell 38, 40 along a portion of the spanwise length of the blade segment 24, 26. For instance, as shown in FIG. 3, each of the hollow tubes may be configured to extend from the joint end 32, 34 of their respective blade segment 24, 26 a given tube length 112. In such embodiments, the tube length 112 may generally correspond to a spanwise length that is less than the overall spanwise length of the blade segment 24, 26. However, in a particular embodiment, the tube length 112 may correspond to a spanwise length ranging from about 1 meter (m) to about 10 m, such as from about 2 m to about 9 m or from about 4 m to about 8 m and/or any other subranges therebetween. Additionally, each support rod 112 may be configured to define a rod length 114 (FIG. 7) that is generally equal to or less than the summation of the tube lengths 112 of the aligned pair of tubes within which the rod 112 is configured to be received.

It should be appreciated that the lengths 112, 114 of the hollow tubes and corresponding support rods may generally be selected based on the design requirements of the rotor blade 22, particularly the load transfer requirements at the blade joint 36. For instance, the lengths 112, 114 may be selected such that the tubes/rods are sufficiently long enough to allow bending and axial loads to be transferred between the blade segments 24, 26. Additionally, the lengths 112, 114 of the tubes/rods may vary within each blade segment 24, 26. For instance, one or more of the tubes within each blade segment 24, 26 may correspond to shorter tubes configured to received shorter support rods while one or more other tubes within each blade segment 24, 26 may correspond to longer tubes configured to receive longer support rods.

It should be appreciated that, in certain embodiments, one or both of the blade segments 24, 26 may define a transition area 116 within its interior at which the structural configuration of the blade segment 24, 26 transitions from the spar cap/shear web arrangement (e.g., similar to shown in FIG. 4) to the disclosed tube/rod arrangement. For instance, as shown in FIGS. 2 and 3, transition areas 116 may be defined within the interior of each blade segment 24, 26 at the interface between the spar caps/shear web(s) and the tubes/rods. An example embodiment of such a transition area 116 will generally be described below with reference to FIG. 10.

Referring now to FIGS. 5 and 6, differing views of the blade segments 24, 26 described above with reference to FIGS. 2-4 are illustrated in accordance with aspects of the present subject matter. Specifically, FIG. 5 illustrates partial, perspective views of the first and second blade segments 24, 26, particularly illustrating the joint ends 32, 34 of the blade segments 24, 26. In addition, FIG. 6 illustrates a cross-sectional view of the first blade-segment 24 shown in FIG. 5 taken about line 6-6.

As shown, each blade segment 24, 26 may include a plurality of hollow tubes 100A, 100B, 102A, 102B, 104A, 104B, 106A, 106B, 108A, 108B extending within the interior of its body shell 38, 40. In several embodiments, each tube of the first blade segment 24 may be configured to be aligned with a corresponding tube of the second blade segment 26. For instance, the corresponding tubes of the first and second blade segments 24, 26 may be positioned at the same locations within their respective shells 38, 40. As such, when the joint ends 32, 34 of the blade segments 24, 26 are brought together, each tube of the first blade segment 24 may be aligned with its corresponding tube of the second blade segment 26.

In one embodiment, each blade segment 24, 26 may include a plurality of tubes positioned directly adjacent to the inner surfaces of its respective body shell 38, 40. For instance, as particularly shown in FIG. 6, the first blade segment 24 may include a first plurality of pressure side tubes 100A extending adjacent to the portion of the first body shell 38 forming the pressure side 42 of the rotor blade 22 and a first plurality of suction side tubes 102A extending adjacent to the portion of the first body shell 38 forming the suction side 44 of the rotor blade 22, with the pressure side tubes 100A being spaced apart from the suction side tubes 100B along a flapwise direction of the rotor blade 22 (indicated by arrow 118 in FIG. 6). Similarly, as shown in FIG. 5, the second blade segment 26 may include a second plurality of pressure side tubes 100B extending adjacent to the portion of the second body shell 40 forming the pressure side 42 of the rotor blade 22 and a second plurality of suction side tubes 102B extending adjacent to the portion of the second body shell 40 forming the suction side 44 of the rotor blade 22, with the pressure side tubes 100B being spaced apart from the suction side tubes 102B along the flapwise direction of the rotor blade 22 (indicated by arrow 118 in FIG. 5).

In several embodiments, the pressure and suction side tubes 100A, 100B, 102A, 102B of the blade segments 24, 26 may be grouped or clustered together at the location(s) adjacent to the pressure and suction sides 42, 44 of the body shells 38, 40 at which spar caps would otherwise be located. For instance, as particularly shown in FIG. 6, the pressure and suction side tubes 100A, 102A may be clustered together along the pressure and suction sides 42, 44 of the first body shell 38 within a spar cap area 120 generally corresponding to the chordwise length across which a spar cap would typically extend. For example, in one embodiment, the spar cap area 120 may be defined across a chordwise length extending from about a 20% chord location of the blade segment 24 (as measured from the leading edge 46) to about a 60% chord location of the blade segment 24 (as measured from the leading edge 46), such as from about a 25% chord location of the blade segment 24 to about a 50% chord location 25 and/or any other subranges therebetween. In such embodiments, the pressure and suction side tubes 100A, 100B, 102A, 102B (along with the support rods 110 received therein) may serve as structural components similar to traditional spar caps along the pressure and suction sides 42, 44 of the body shells 38, 40.

Additionally, in several embodiments, each blade segment 24, 26 may also include a plurality of tubes 104A, 104B stacked between the pressure and suction side tubes 100A, 100B, 102A, 102B along the flapwise direction 118 of the rotor blade 22. Specifically, as shown in FIG. 6, the first blade segment 24 may include a first plurality of intermediate tubes 104A stacked directly between the pressure and suction side tubes 100A, 102A such that the intermediate tubes 104A generally occupy the flapwise space defined between the pressure and suction side tubes 100A, 102A. Similarly, as shown in FIG. 5, the second blade segment 26 may include a second plurality of intermediate tubes 104B stacked directly between the pressure and suction side tubes 100B, 102B such that the intermediate tubes 104B generally occupy the flapwise space defined between the pressure and suction side tubes 100B, 102B.

Moreover, the blade segments 24, 26 may also include one or more tubes positioned adjacent to the leading edge 46 and/or the trailing edge 48 of the rotor blade 22. For example, as shown in FIGS. 5 and 6, each blade segment 24, 26 may include a plurality of leading edge tubes 106A, 106B extending adjacent to the leading edge 46 of the blade 22 and a plurality of trailing edge tubes 108A, 108B extending adjacent to the trailing edge 48 of the blade 22.

It should be appreciated that the various disclosed tubes may generally be formed from any suitable material that allows the tubes to function as described herein. However, in a particular embodiment, each tube may be formed from a fiber-reinforced composite material, such as a fiber-reinforced composite including a plurality of fibers (e.g., glass or carbon fibers) surrounded by a resin matrix material (e.g., a thermoset or thermoplastic resin material). In such an embodiment, the tubes may, for example, be formed using a pultrusion process in which resin-impregnated fibers are pulled through a stationary die configured to form the hollow, tubular shape of the tubes.

It should also be appreciated that the tubes may be configured to define any suitable cross-sectional shape. For instance, in the illustrated embodiment, each of the tubes defines a circular cross-sectional shape. However, in other embodiments, the tubes may define any other suitable cross-sectional shape that allows a corresponding support rod to be received and/or installed therein. For example, FIG. 15 illustrates non-limiting examples of various other cross-sectional shapes that may be suitable for disclosed tubes. Specifically, as shown in FIG. 15, the tubes 100, 102, 104, 106, 108 may be configured to define a quadrilateral cross-sectional shape, such as rectangular cross-sectional shape or a parallelogram-shaped cross-section, a triangular cross-sectional shape, a pentagonal cross-sectional shape, an octagonal cross-sectional shape and/or any other suitable polygonal cross-sectional shape.

Additionally, it should be appreciated that the tubes may be configured to be installed within each blade segment 24, 26 using any suitable installation means and/or methodology known in the art. In one embodiment, two or more of the tubes may be pre-assembled prior to being installed into their corresponding blade segment 24, 26. For instance, in the embodiment shown in FIGS. 5 and 6, the pressure side tubes 100A, 100B, the suction side tubes 102A, 102B and the intermediate tubes 104A, 104B of each blade segment 24, 26 may be configured to be pre-assembled (e.g., using a separate assembly fixture) into a single tube stack or bundle (e.g., by positioning the tubes at the desired locations relative to one another and then coupling the tubes together using a resin infusion process, adhesives and/or any other suitable means). The resulting tube stacks/bundles may then be installed within each blade segment 24, 26. A similar pre-assembled tube bundle may also be created for the leading edge tubes 106A, 106B and/or the trailing edge tubes 108A, 108B. Alternatively, the tubes may be installed within each blade segment 24, 26 using any other suitable installation means and/or methodology, such as by individually installing each tube within its respective blade segment 24, 26.

As indicated above, the rotor blade 22 may also include a plurality of support rods 110 configured to be installed within the disclosed tubes such that each support rod 110 extends across the blade joint 36 defined between the first and second blade segments 24, 26. Specifically, one end of each support rod 110 may be configured to be received within a given tube of the first blade segment 24, with the opposed end being received within a corresponding tube of the second blade segment 26. As such, when installed across an aligned pair of tubes, each support rod 110 may provide an alignment/connection means between the blade segments 24, 26 and may also provide a means for transferring loads between the blade segments 24, 26.

In several embodiments, the support rods 110 may only be received within a portion of the tubes provided within each blade segment 24, 26 such that, when the blade segments 24, 26 are coupled together, one or more of the tubes remain un-filled or hollow. For example, as shown in the illustrated embodiment, each pair of aligned pressure and suction side tubes 100A, 100B, 102A, 102B and each aligned pair of leading and trailing edge tubes 106A, 106B, 108A, 108B is configured to receive a support rod 110. In addition, the intermediate tubes 104A, 104B positioned directly adjacent to the pressure and suction side tubes 100A, 100B, 102A, 102B are configured to receive support rods 110 (e.g., each row of intermediate tubes 104A, 104B positioned directly adjacent to the row(s) defined by the pressure and/or suction side tubes 100A, 100B, 102A, 102B). However, as shown in FIGS. 5 and 6, the remainder of the intermediate tubes 104A, 104B may be configured to remain hollow when the blade segments 24, 26 are coupled to one another. Alternatively, a support rod 110 may be configured to be received within each pair of aligned tubes contained within the blade segments 24, 26. For instance, in the illustrated embodiment, additional support rods 110 may be installed within the remainder of intermediate tubes 104A, 104B to allow each pair of aligned tubes to include a support rod 110 extending therebetween when the blade segments 24, 26 are coupled together.

It should be appreciated that the specific number of support rods 110 installed at the blade joint 36 and/or the specific placement of the rods 110 within the aligned tubes may be tailored to meet the performance requirements and/or structural requirements of the rotor blade 22 being assembled. For instance, in the illustrated embodiment, the specific number and/or placement of the rods 110 shown in FIGS. 5 and 6 may be desirable for the particular configuration of the tip segment 26 that is being installed into the root segment 24. However, if the configuration of the tip segment 26 is varied, the number and/or placement of the rods 110 may also be varied as is necessary and/or desired. For instance, if the tip segment 26 being installed corresponds to a shorter tip segment (or a tip segment having a decreased weight), it may be desirable to reduce the number of support rods 110 (e.g., by only installing support rods across all or portions of the pressure and suction tubes 100A, 100B, 102A, 102B and/or the leading and trailing edge tubes 106A, 106B, 108A, 108B). Similarly, if the tip segment 26 being installed corresponds to a longer tip segment (or a tip segment having an increased weight), it may be desirable to increase the number of support rods 110 (e.g., by installing support rods in each aligned pairs of tubes).

It should also be appreciated that the support rods 110 may generally be formed from any suitable material that provides the desired structural properties for the rotor blade 22. For instance, in several embodiments, the support rods 110 may be formed from a fiber-reinforced composite material, such as a fiber-reinforced composite including a plurality of fibers (e.g., glass or carbon fibers) surrounded by a resin matrix material (e.g., a thermoset or thermoplastic resin material). In another embodiment, the support rods 110 may be formed from any other suitable rigid material, such as a metal material.

Additionally, in several embodiments, each support rod 110 may be configured to define any suitable cross-sectional shape that allows it to be received within a corresponding pair of aligned tubes. For instance, in the illustrated embodiment, each support rod 110 has a circular cross-sectional shape. However, in other embodiments, the support rods 110 may be define any other suitable polygonal cross-sectional shape, such as any of the cross-sectional shapes shown in FIG. 15. Moreover, it should be appreciated that the cross-sectional shape(s) of the support rods 110 may differ from the cross-sectional shape(s) of the tubes. For instance, the dimension(s) of the circular support rods 110 shown in the illustrated embodiment may be selected such that the support rods 110 may be received within any of the tubes described herein, including any of the tubes 100, 102, 104, 106, 108 shown in FIG. 15 (e.g., as indicated by the dashed circles 110 shown in FIG. 15).

Referring now to FIG. 7, a simplified view of one example of a method for installing a support rod 110 within a pair of aligned tubes (e.g., aligned pressure side tubes 100A, 100B) is illustrated in accordance with aspects of the present subject matter. As shown, the support rod 110 may be initially installed within one of the tubes 100A, 100B (e.g., similar to embodiment shown in FIG. 5 in which the support rods 110 are initially installed within the tubes extending within the first blade segment 24). For example, in the illustrated embodiment, a first end 122 of the support rod 110 may be inserted into a first pressure side tube 100A of the first blade segment 24 until the first end 122 of the support rod 110 is positioned at or adjacent to a closed end 124 of the pressure side tube 100A. In such an embodiment, prior to inserting the first end 122 of the support rod 110 into the first pressure side tube 100A, the tube 100A may be at least partially filled with a suitable adhesive material 126. As such, when the support rod 110 is received within the first pressure side tube 100A, the adhesive material 126 may flow away from the closed end 124 so as to surround all or a portion of the section of the rod 110 extending within the first pressure side tube 100A. Thereafter, when the second blade segment 26 is being coupled to the first blade segment 24, a corresponding, second pressure side tube 100B of the second blade segment 26 may be aligned with the support rod 110 such that, as the second blade segment 24 is moved closer to the first blade segment 26, a second end 128 of the support rod 110 may be received within the second pressure side tube 100B. Similar to that described above, the second pressure side tube 100B may also be at least partially filled with an adhesive material 126 prior to the support rod 110 being inserted therein. As such, as a closed end 130 of the second pressure side tube 100B is moved closer to the second end 128 of the support rod 110, the adhesive material 126 may flow away from the closed end 130 so as to surround all or a portion of the section of the rod 110 extending within the second pressure side tube 100B.

It should be appreciated that, as opposed to pre-filling the tubes 100A, 100B with the adhesive material 126, the adhesive material 126 may be pumped into one or both tubes 100A, 100B after the support rod 110 has been installed therein. Additionally, in alternative embodiments, the support rod 110 may be secured within the corresponding tubes 100A, 100B using any other suitable attachment means and/or methodology known in the art. For instance, if both the tubes 100A, 100B and the support rod 110 are formed from a thermoplastic-based fiber-reinforced composite, the thermoplastic resin material contained within the tubes 100A, 100B may be welded to the thermoplastic resin material of the support rod 110 to allow the components to be coupled together.

Referring now to FIGS. 8 and 9, another embodiment of a rod/tube arrangement that may be utilized within a segmented rotor blade 22 is illustrated in accordance with aspects of the present subject matter. Specifically, FIG. 8 illustrates a partial, perspective view of the first and second blade segments 24, 26, particularly illustrating the joint ends 32, 34 of the blade segments 24, 26 including a differing rod/tube arrangement. In addition, FIG. 9 illustrates a cross-sectional view of the first blade-segment 24 shown in FIG. 8 taken about line 9-9.

As shown in FIGS. 8 and 9, similar to the embodiment shown in FIGS. 5 and 6, each blade segment 24, 26 may include a plurality of pressure side tubes 100A, 100B positioned adjacent to the pressure side 42 of its respective body shell 38, 40 and a plurality of suction side tubes 102A, 102B positioned adjacent to the suction side 44 of its respectively body shell 38, 40, with the pressure and suction side tubes 100A, 100B, 102A, 102B generally being grouped or clustered together along each side of their corresponding shell 38, 40 within a spar cap area 120 of the rotor blade 22. In addition, each blade segment 24, 26 includes one or more leading edge tubes 106A, 106B positioned adjacent to the leading edge 46 and one or more trailing edge tubes 108A, 108B positioned adjacent to the trailing edge 48. However, as shown in FIGS. 8 and 9, unlike the embodiment described above in which each blade segment 24, 26 includes a plurality of intermediate tubes 104A, 104B stacked between the pressure and suction side tubes 100A, 100B, 102A, 102B, each blade segment 24 includes a volume of filler material 132A, 132B extending between the pressure and suction side tubes 100A, 102A, 102B, 102B.

In general, the filler material 132A, 132B may be configured to fill or occupy the space or gap defined between the pressure and suction side tubes 100A, 100B, 102A, 102B along the flapwise direction 118 of the rotor blade 22. As such, the filler material 132A, 132B may generally correspond to any suitable material that can be used to fill such space or gap. However, in a particular embodiment, the filler material 132A, 132B may correspond to a relatively lightweight, low-density material. For instance, the filler material 132A, 132B may correspond to a low-density foam material. Suitable low-density foam materials may include, but are not limited to, polystyrene foams (e.g., expanded polystyrene foams), polyurethane foams, other foam rubbers/resin-based foams and various other open cell and closed cell foams. Alternatively, the filer material 132A, 132B may correspond to any other suitable low-density materials, such as balsa wood, cork and/or the like.

Referring now to FIGS. 10 and 11, a further embodiment of a rod/tube arrangement that may be utilized within a segmented rotor blade 22 is illustrated in accordance with aspects of the present subject matter. Specifically, FIG. 10 illustrates a partial, perspective view of the first and second blade segments 24, 26, particularly illustrating the joint ends 32, 34 of the blade segments 24, 26 including yet another rod/tube arrangement. In addition, FIG. 11 illustrates a cross-sectional view of the first blade-segment 24 shown in FIG. 10 taken about line 11-11.

As shown in FIGS. 10 and 11, similar to the embodiments shown in FIGS. 5, 6, 8 and 9, each blade segment 24, 26 may include a plurality of pressure side tubes 100A, 100B positioned adjacent to the pressure side 42 of its respective body shell 38, 40 and a plurality of suction side tubes 102A, 102B positioned adjacent to the suction side 44 of its respective body shell 38, 40, with the pressure and suction side tubes 100A, 100B, 102A, 102B generally being grouped or clustered together along each side of their corresponding shell 38, 40 within a spar cap area 120 of the rotor blade 22. In addition, each blade segment 24, 26 includes one or more leading edge tubes 106A, 106B positioned adjacent to the leading edge 46 and one or more trailing edge tubes 108A, 108B positioned adjacent to the trailing edge 48. However, as shown in FIGS. 10 and 11, unlike the embodiments described above in which the blade segment 24 includes a plurality of intermediate tubes 104A, 104B or a filler material 132A, 132B positioned between the pressure and suction side tubes 100A, 100B, 102A, 102B, the blade segment 24 includes a shear web 134A, 134B extending between the pressure and suction side tubes 100A, 100B, 102A, 102B.

It should be appreciated that each shear web 134A, 134B may generally be formed from any suitable material. However, in particular embodiment, each shear web 134A, 134B may be formed from a relatively stiff, rigid material so as to provide flapwise support to the rotor blade 22 between the pressure and suction tubes 100A, 100B, 102A, 102B. For instance, each shear web 134A, 134B may be formed from a fiber-reinforced composite material, such as a fiber-reinforced composite including a plurality of fibers (e.g., glass or carbon fibers) surrounded by a resin matrix material (e.g., a thermoset or thermoplastic resin material).

In one embodiment, each shear web 134A, 134B may correspond to a portion of the shear web extending through the remainder of the blade segment 24, 26. For example, the shear web 58 (FIG. 4) positioned between the opposed spar caps 54, 56 of the first blade segment 24 may be configured to extend in the spanwise direction to a location at or adjacent to the first joint end 32 of the blade segment 24 such that the shear web 58 forms a continuous structural member of the blade segment 24. An example of such a continuous shear web 58, 134 is shown in FIG. 12, which illustrates a cross-sectional view of one embodiment of a transition area 116 that may be defined between the spar caps 54, 56 and pressure and suction side tubes 100A, 102A of the first blade segment 24. As shown in FIG. 12, at the transition area 116 of the blade segment 24, the support structure for the first body shell 38 may transition from the spar caps 54, 56 to the rod/tube arrangement. In particular, along the pressure side 42 of the body shell 38, the support structure may transition from the pressure side spar cap 54 to the pressure side tube(s) 100A and the associated rod(s) 110 at an interface 136 (e.g., a tapered or scarfed interface) defined between the spar cap 54 and the pressure side tube(s) 100A. Similarly, along the suction side 44 of the body shell 38, the support structure may transition from the suction side spar cap 56 to the suction side tube(s) 102A and the associated rod(s) 110 at an interface 138 (e.g., a tapered or scarfed interface) defined between the spar cap 56 and the suction side tube(s) 102A. Additionally, as shown in FIG. 12, when the shear web 134 corresponds to a continuation of the shear web 58 positioned between the spar caps 54, 56, the shear web 134, 58 may extend across the interface defined between the spar caps 54, 56 and the tubes 100A, 102A so as to also be positioned between the pressure and suction side tubes 100A, 102A. Alternatively, in an embodiment in which the shear web 134 corresponds to a separate component of the blade segment 24, the shear web 134 may be attached to or abut against the shear web 58 extending between the spar caps 54, 56 at the interface defined between the spar caps 54, 56 and the tubes 100A, 102A (e.g., along interface line 140).

It should be appreciated that similar transition areas 116 may also be defined within the blade segments 24, 26 for the embodiments described above with reference to FIGS. 2-6, 8 and 9. For example, in the embodiment shown in FIG. 6, the intermediate tubes 104A may be attached to or abut against the shear web 58 extending between the spar caps 54, 56 at the interface defined between the spar caps 54, 56 and the tubes 100A, 102A (e.g., along interface line 140). Similarly, in the embodiment shown in FIG. 9, the filter material 132A may be attached to or abut against the shear web 58 extending at the interface defined between the spar caps 54, 56 and the tubes 100A, 102A.

Referring now to FIGS. 13 and 14, another embodiment of a rod/tube arrangement that may be utilized within a segmented rotor blade 22 is illustrated in accordance with aspects of the present subject matter. Specifically, FIG. 13 illustrates a partial, perspective view of the first and second blade segments 24, 26, particularly illustrating the joint ends 32, 34 of the blade segments 24, 26 including a differing rod/tube arrangement. In addition, FIG. 14 illustrates a cross-sectional view of the first blade-segment 24 shown in FIG. 13 taken about line 14-14.

As shown in FIGS. 13 and 14, unlike the embodiments shown in FIGS. 2-6 and 8-11, each blade segment 24 only includes a plurality of pressure side tubes 100A, 100B positioned adjacent to the pressure side 42 of its respective body shell 38, 40 and a plurality of suction side tubes 102A, 102B positioned adjacent to the suction side 44 of its respective body shell 38, 40. Additionally, as opposed to being grouped or clustered within a spar cap area 120 of the rotor blade 22, the pressure and suction side tubes 100A, 100B, 102A, 102B are spaced apart along the interior of the pressure and suction sides 42, 44 of each body shell 38, 40. Specifically, as shown in FIGS. 13 and 14, the pressure side tubes 100A, 100B may be spaced apart along the interior of the pressure side 42 of each body shell 38, 40 between the leading and trailing edges 46, 48 of the blade 22. Similarly, the suction side tubes 102A, 102B may be spaced apart along the interior of the suction side 44 of each body shell 38, 40 between the leading and trailing edges 46, 48 of the blade 22.

It should be appreciated that the present subject matter is also directed to a method for assembling a segmented rotor blade. In several embodiments, the method may include positioning a first joint end of a first blade segment relative to a second joint end of a second blade segment. As indicated above, the first and second blade segments 24, 26 may each include a plurality of hollows tubes extending therein, such as one or more pressure side tubes 100A, 100B and one or more suction side tubes 102A, 102B. The method may also include inserting both a first support rod 110 within one of a pressure side tube 100A of the first blade segment 24 or a pressure side tube 100B of the second blade segment 26 and a second support rod 100 within one of a suction side tube 102A of the first blade segment 24 or a suction side tube 102B of the second blade segment 26. In addition, the method may include moving the first and second blade segments 24, 26 together such that the first support rod 110 is received within the other of the pressure side tube 100A of the first blade segment 24 or the pressure side tube 100B of the second blade segment 26 and the second support rod is received within the other of the suction side tube 102A of the first blade segment 24 or the suction side tube 102B of the second blade segment 26.

Additionally, in embodiments in which each blade segment 24, 26 includes a plurality of pressure side tubes 100A, 100B and a plurality of suction side tubes 102A, 102B, the method may also include inserting a plurality of support rods 110 into the pressure side tubes 100A of the first blade segment 26 or the pressure side tubes 100B of the second blade segment 26 and inserting a plurality of support rods 110 into the suction side tubes 102A of the first blade segment 26 or the suction side tubes 102B of the second blade segment 26. As such, when the blade segments 24, 26 are moved together, the support rods 110 may be received within the corresponding pressure and suction side tubes 100A, 100B, 102A, 102B of the adjacent blade segment.

Moreover, in one embodiment, the method may include inserting a support rod 110 within one of a leading edge tube 106A of the first blade segment 24 or a leading edge tube 106B of the second blade segment 26 and/or inserting a support rod 110 within one of a trailing edge tube 108A of the first blade segment 24 or a trailing edge tube 108B of the second blade segment 26. In such an embodiment, when the blade segments 24, 26 are moved together, the support rod(s) 110 may be received within the corresponding leading edge tube 106A, 106B and/or the corresponding trailing edge tube 108A, 108B of the adjacent blade segment.

It should be appreciated that, although the present subject matter has generally been described herein with reference to embodiments including tubes installed within both of the adjacent blade segments, the disclosed the rotor blade may, instead, include one blade segment having tubes installed therein and another blade segment having support rods installed therein without corresponding tubes. For instance, referring to the embodiments described above, the first blade segment 24 may include a plurality of hollow tubes (e.g., tubes 100A, 102A, 104A, 106A, 108A) extending lengthwise from the first joint end 32 towards the blade root 28. Similarly, the second blade segment 26 may include a plurality of support rods 110 installed therein without corresponding tubes such that the rods 110 extend outwardly from the second joint end 34 of the blade segment 26, with each support rod 110 being configured to be aligned with one of the tubes installed within the first blade segment 24. In such an embodiment, when the joint ends 32, 34 of the blade segments 24, 26 are brought together, the support rods 110 extending outwardly from the second blade segment 26 may be received within the tubes installed within the first blade segment 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
    a first blade segment including a first body shell terminating at a first joint end, the first body shell including a pressure side and a suction side extending between a leading edge and a trailing edge, the first blade segment including a first pressure side spar cap terminating within the first body shell at a first transition end and a first pressure side tube extending adjacent to the pressure side of the first body shell between the first transition end of the first pressure side spar cap and the first joint end, the first blade segment further including a first suction side spar cap terminating within the first body shell at a second transition end and a first suction side tube extending adjacent to the suction side of the first body shell between the second transition end of the first suction side spar cap and the first joint end, the first pressure side tube being spaced apart from the first suction side tube along a flapwise direction of the rotor blade;
    a second blade segment including a second body shell terminating at a second joint end, the second body shell including a pressure side and a suction side extending between a leading edge and a trailing edge, the second blade segment including a second pressure side tube extending adjacent to the pressure side of the second body shell and a second suction side tube extending adjacent to the suction side of the second body shell, the second pressure and suction side tubes being configured to be aligned with the first pressure and suction side tubes, respectively, when the second joint end of the second blade segment is coupled to the first joint end of the first blade segment; and
    a plurality of support rods extending between the first and second blade segments, the plurality of support rods including a first support rod extending from the first pressure side tube to the second pressure side tube such that the first support rod is received within both the first pressure side tube and the second pressure side tube, the plurality of support rods further including a second support rod extending from the first suction side tube to the second suction side tube such that the second support rod is received within both the first suction side tube and the second suction side tube.

2. The rotor blade of claim 1, wherein the first pressure side tube corresponds to one of a first plurality of pressure side tubes extending adjacent to the pressure side of the first body shell and the first suction side tube corresponds to one of a first plurality of suction side tubes extending adjacent to the suction side of the first body shell, wherein the second pressure side tube corresponds to one of a second plurality of pressure side tubes extending adjacent to the pressure side of the second body shell and the second suction side tube corresponds to one of a second plurality of suction side tubes extending adjacent to the suction side of the second body shell.

3. The rotor blade of claim 2, wherein at least a portion of the first plurality of pressure and suction side tubes are clustered together along the pressure and suction sides, respectively, of the first blade segment within a chordwise spar cap area of the rotor blade and wherein at least a portion of the second plurality of pressure and suction side tubes are clustered together along the pressure and suction sides, respectively, of the second blade segment within the chordwise spar cap area of the rotor blade.

4. The rotor blade of claim 3, wherein the first blade segment includes a first plurality of intermediate tubes stacked between the first plurality of pressure and suction side tubes along the flapwise direction of the rotor blade and wherein the second blade segment includes a second plurality of intermediate tubes stacked between the second plurality of pressure and suction side tubes along the flapwise direction of the rotor blade.

5. The rotor blade of claim 3, wherein the first blade segment includes a first volume of filler material positioned between the first plurality of pressure and suction side tubes along the flapwise direction of the rotor blade and wherein the second blade segment includes a second volume of filler material positioned between the second plurality of pressure and suction side tubes along the flapwise direction of the rotor blade.

6. The rotor blade of claim 3, wherein the first blade segment includes a first shear web extending between the first plurality of pressure and suction side tubes along the flapwise direction of the rotor blade and wherein the second blade segment includes a second shear web extending between the second plurality of pressure and suction side tubes along the flapwise direction of the rotor blade.

7. The rotor blade of claim 2, wherein the first plurality of pressure side tubes are spaced apart from one another along the pressure side of the first blade segment and the first plurality of suction side tubes are spaced apart from one another along the suction side of the first blade segment, wherein the second plurality of pressure side tubes are spaced apart from one another along the pressure side of the second blade segment and the first plurality of suction side tubes are spaced apart from one another along the suction side of the second blade segment.

8. The rotor blade of claim 1, further comprising at least one first leading edge tube positioned adjacent to the leading edge of the first blade segment and at least one second leading edge tube positioned adjacent to the leading edge of the second blade segment.

9. The rotor blade of claim 1, further comprising at least one first trailing edge tube positioned adjacent to the trailing edge of the first blade segment and at least one second trailing edge tube positioned adjacent to the trailing edge of the second blade segment.

10. The rotor blade of claim 1, wherein the first blade segment corresponds to a root segment and the second blade segment corresponds to a tip segment, the root segment extending between the first joint end and a blade root of the rotor blade, the tip segment extending between the second joint end and a blade tip of the rotor blade.

11. A blade segment for a wind turbine rotor blade, the blade segment comprising:
a body shell terminating at a joint end, the body shell including a pressure side and a suction side extending between a leading edge and a trailing edge;
a plurality of pressure side tubes extending adjacent to the pressure side of the body shell;
a plurality of suction side tubes extending adjacent to the suction side of the body shell, the plurality of pressure side tubes being spaced apart from the plurality of suction side tubes along a flapwise direction of the rotor blade; and
a plurality of intermediate tubes stacked between the plurality of pressure and suction side tubes along the flapwise direction of the blade segment,
wherein at least a portion of the plurality of pressure and suction side tubes are clustered together along the pressure and suction sides, respectively, of the body shell within a chordwise spar cap area of the blade segment.

12. The blade segment of claim 11, further comprising a plurality of support rods configured to be received within the plurality of pressure and suction side tubes.

13. The blade segment of claim 12, wherein the plurality of support rods are installed within a separate blade segment of the wind turbine rotor blade.

14. The blade segment of claim 11, wherein the plurality of pressure side tubes are spaced apart from one another along the pressure side of the body shell and the plurality of suction side tubes are spaced apart from one another along the suction side of the blade shell.

15. The blade segment of claim 11, further comprising at least one of a leading edge tube positioned adjacent to the leading edge of the body shell or a trailing edge tube positioned adjacent to the trailing edge of the body shell.

16. A method for assembling a rotor blade, the method comprising:
positioning a first joint end of a first blade segment relative to a second joint end of a second blade segment, the first blade segment including a first pressure side spar cap terminating within the first blade segment at a first transition end and a first pressure side tube extending adjacent to a pressure side of the first blade segment between the first transition end of the first pressure side spar cap and the first joint end, the first blade segment further including first suction side spar cap terminating within the first blade segment at a second transition end and a first suction side tube extending adjacent to a suction side of the first blade segment between the second transition end of the first suction side spar cap and the first joint end, the first pressure side tube being spaced apart from the first suction side tube along a flapwise direction of the rotor blade, the second blade segment including a second pressure side tube extending adjacent to a pressure side of the second blade segment and a second suction side tube extending adjacent to a suction side of the second blade segment;
inserting a first support rod within one of the first pressure side tube or the second pressure side tube and a second support rod within one of the first suction side tube or the second suction side tube; and
moving the first and second blade segments together such that the first support rod is received within the other of the first pressure side tube or the second pressure side tube and the second support rod is received within the other of the first suction side tube or the second suction side tube.

17. The method of claim 16, further comprising aligning the other of the first pressure side tube or the second pressure side tube with the first support rod and aligning the other of the first suction side tube or the second suction side tube with the second support rod.

18. The method of claim 16, wherein the first pressure side tube corresponds to one of a first plurality of pressure side tubes extending adjacent to the pressure side of the first blade segment and the first suction side tube corresponds to one of a first plurality of suction side tubes extending adjacent to the suction side of the first blade segment, wherein the second pressure side tube corresponds to one of a second plurality of pressure side tubes extending adjacent to the pressure side of the second blade segment and the second suction side tube corresponds to one of a second plurality of suction side tubes extending adjacent to the suction side of the second blade segment.

19. The method of claim 18, wherein inserting the first support rod within one of the first pressure side tube or the second pressure side tube comprises inserting each of a plurality of first support rods within a respective one of the first plurality of pressure side tubes and wherein inserting the second support rod within one of the first suction side tube or the second suction side tube comprises inserting each of a plurality of second support rods within a respective one of the first plurality of suction side tubes.

20. The method of claim 19, wherein moving the first and second blade segments together comprises moving the first and second blade segments such that each of the plurality of first support rods is received within a respective one of the second plurality of pressure side tubes and each of the plurality of second support rods is received within a respective one of the second plurality of suction side tubes.

* * * * *